United States Patent [19]
Christensen

[11] 3,805,981
[45] Apr. 23, 1974

[54] SYSTEM FOR TOWING AND OPERATING A FORK-LIFT TRAILER
[75] Inventor: Carl O. Christensen, Alamo, Calif.
[73] Assignee: Roll-Rite Corporation, Oakland, Calif.
[22] Filed: Mar. 16, 1973
[21] Appl. No.: 342,156

[52] U.S. Cl............. 214/140, 214/77 R, 214/710
[51] Int. Cl............................................. B66f 9/00
[58] Field of Search ........... 214/140, 670, 671, 672, 214/673, 674, 660, 130, 700, 131, 710, 711, 77 R, 712, 714, 715

[56] References Cited
UNITED STATES PATENTS
3,666,128   5/1972   Shimizu ............................ 214/730
1,872,823   8/1932   Sanford ............................. 214/621
3,550,802   12/1970  Ellerd ............................... 214/512
3,739,930   6/1973   Hardwick .......................... 214/390

Primary Examiner—Albert J. Makay
Assistant Examiner—Lawrence J. Oresky
Attorney, Agent, or Firm—Mellin, Moore & Weissenberger

[57] ABSTRACT

A system for towing and operating a fork-lift trailer including an electrically motor-driven tractor towing a trailer having a fork-lift system thereon. The trailer includes means thereon independent of the operation of the tractor for selectively and cumulatively starting and activating the motor of the tractor to drive the tractor forwardly, thereby towing the trailer.

6 Claims, 15 Drawing Figures

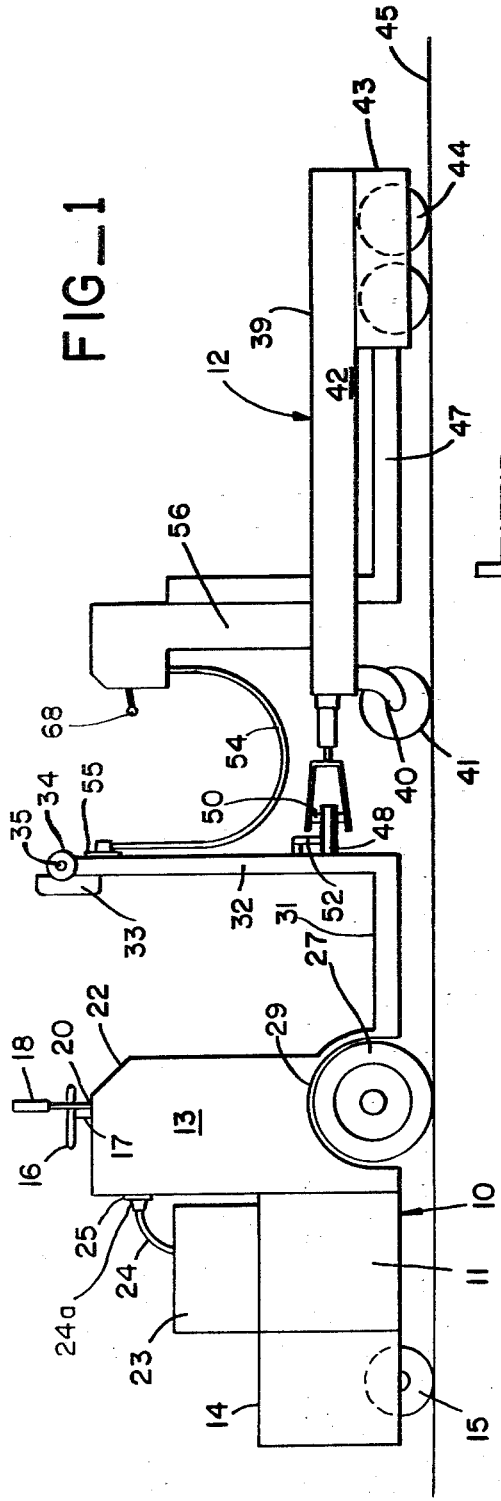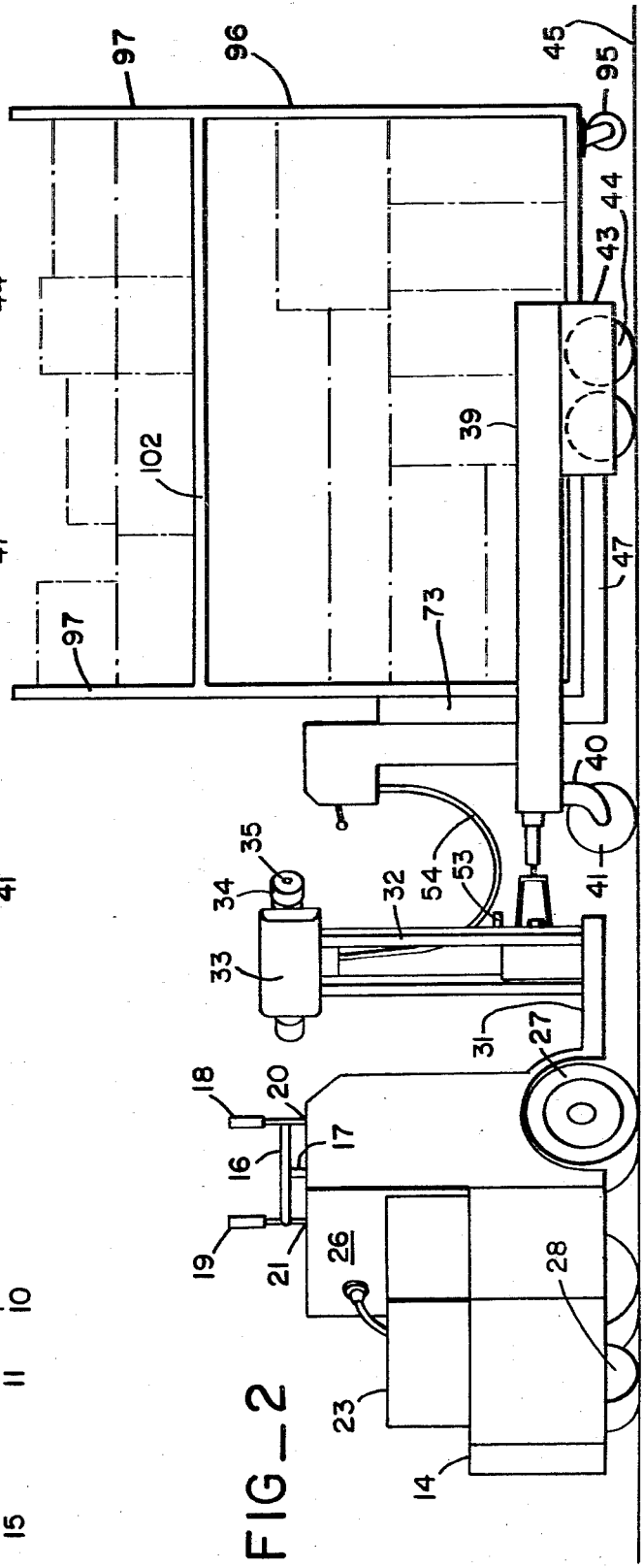

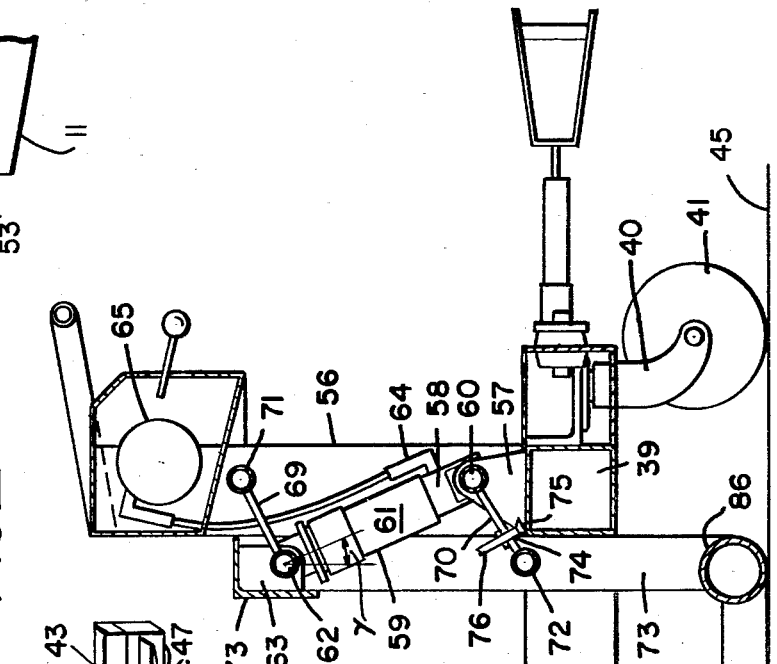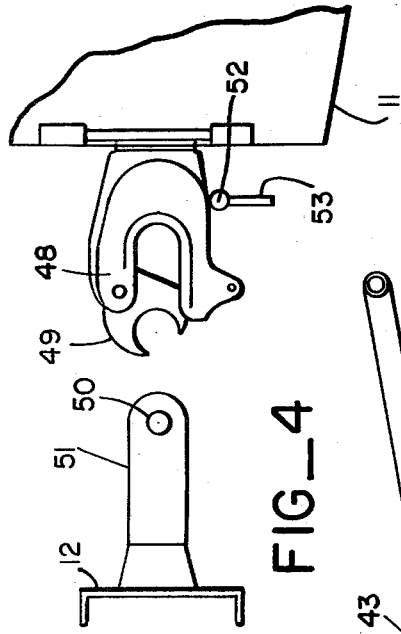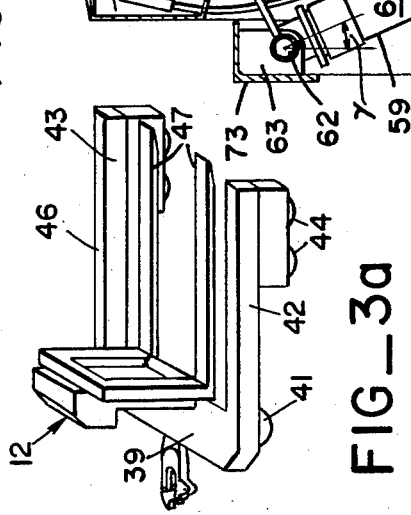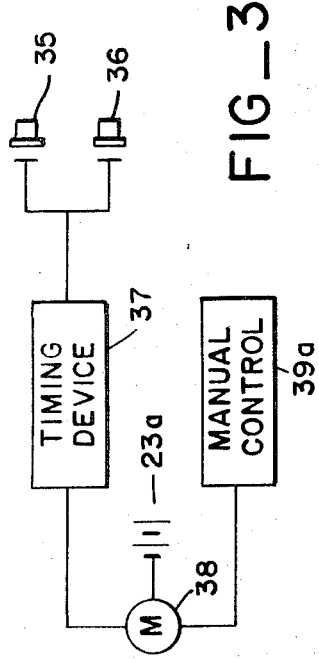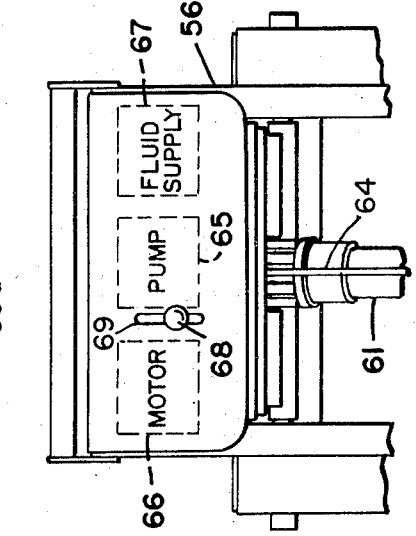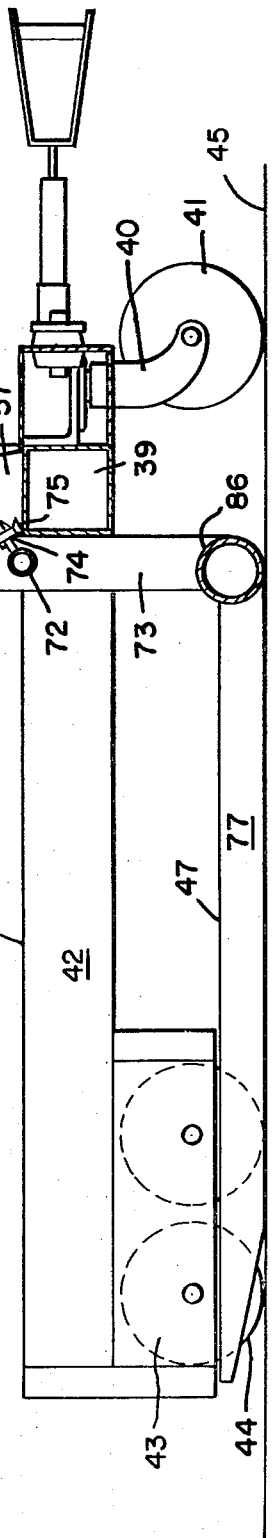

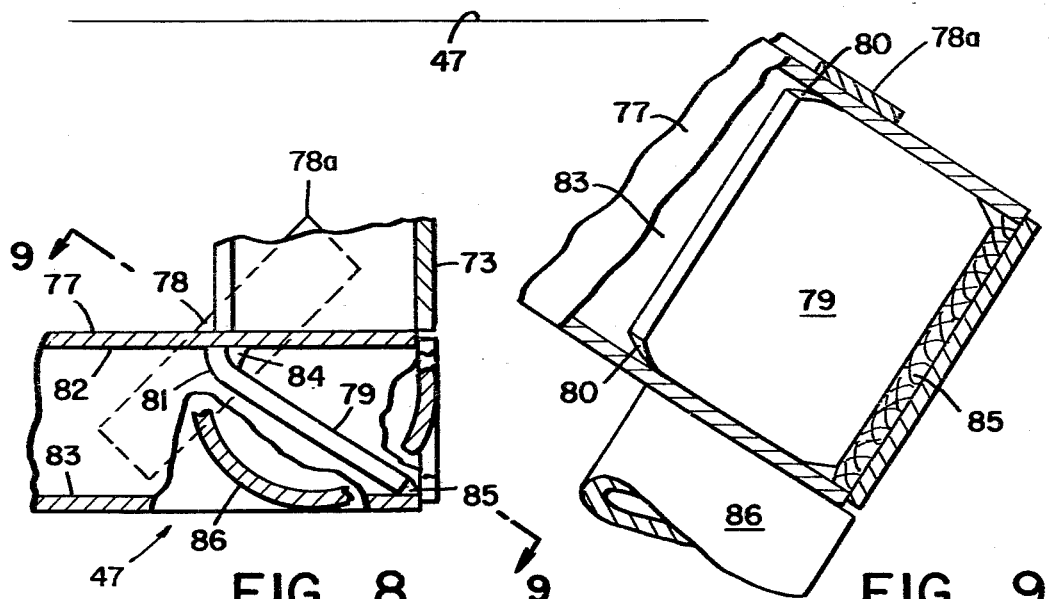
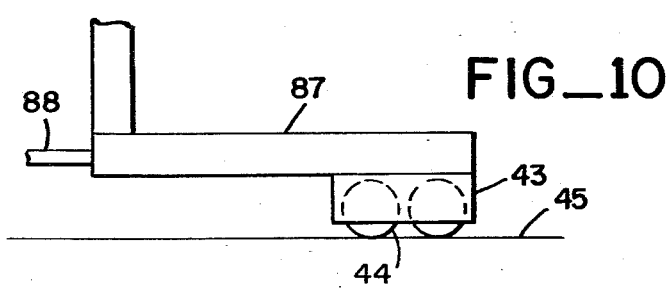
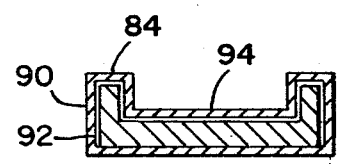
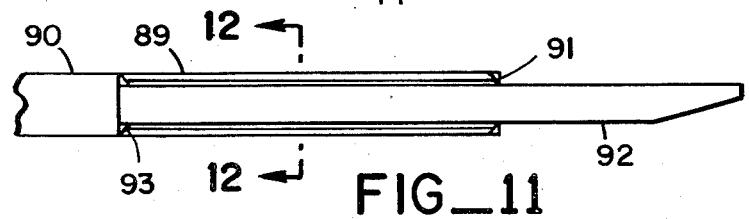
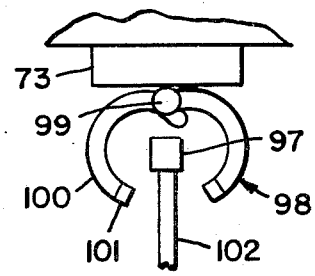 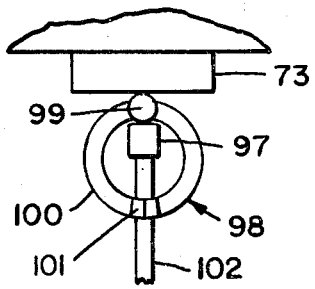

SYSTEM FOR TOWING AND OPERATING A FORK-LIFT TRAILER

BACKGROUND OF THE INVENTION

1. Field of the Invention

The invention relates to fork-lift trailers; and, more particularly, to a system for controlling the operation of such trailers.

2. Description of the Prior Art

It is well known in the material-handling art to operate trailers having fork-lifts thereon from a tractor towing such trailers. However, generally all operations of such trailers need be carried out on the tractor itself. Thus, an operator must return to the tractor and operate the tractor after each material-handling operation to tow the trailer to its next position. If a multitude of stops are required for loading such trailers, the operator must get on and off each time a stop is made before the trailer can be pulled to the next stop.

SUMMARY OF THE INVENTION

It is an object of this invention to provide a system for towing a trailer behind a tractor without the necessity of the operator being on the tractor itself.

It is a further object of this invention to provide such a system for remotely actuating the tractor for a preselected distance which distance can be quickly and easily varied by the operator also without the necessity of returning to the tractor.

It is still a further object of this invention to provide such a system wherein the trailer may be quickly and easily disconnected from the tractor.

It is an even further object of this invention to provide such a system whereby the fork-lift on the trailer may be raised and lowered at an angle to the trailer so that goods carried thereon abut against the rear of the trailer.

These and other objects are preferably accomplished by providing a system whereby an electrically motor-driven tractor is provided which tows a trailer having a fork-lift system thereon. The trailer includes means thereon independent of the operation of the tractor for selectively and cumulatively starting and activating the motor of the tractor to drive the tractor forwardly, thereby towing the trailer. The trailer may include means thereon for automatically raising and lowering the fork of the fork-lift thereon, such means also raising the fork at a slight angle from the horizontal. The trailer may also include means for locking the fork-lift system until a load or loads on the trailer are in proper carrying position thereon. Various other features and modifications may be provided on the trailer for assisting in material-handling operations.

BRIEF DESCRIPTION OF THE DRAWING

FIG. 1 is a vertical view of a tractor-trailer combination in accordance with my invention;

FIG. 2 is a view similar to FIG. 1 showing the trailer in a different position and a load carried by the trailer;

FIG. 3 is a schematic view of an electrical system for activating the motor of the tractor of FIGS. 1 and 2;

FIG. 3a is a perspective view of the trailer of FIGS. 1 and 2 alone;

FIG. 4 is a top plan view of the coupling mechanism for the tractor-trailer combination of FIGS. 1 and 2;

FIG. 5 is a vertical sectional view of the trailer alone of FIGS. 1 and 2;

FIG. 6 is a partly schematic end view of a portion of the trailer of FIG. 5;

FIG. 7 is a schematic view demonstrating the operation of the fork-lift system of the trailer of FIGS. 5 and 6;

FIG. 8 is a sectional vertical view of a portion of the fork-lift of the trailer of FIGS. 5 and 6;

FIG. 9 is a view taken along lines 9—9 of FIG. 8;

FIG. 10 is a side view of a modification of the trailer alone of FIGS. 1 and 2;

FIG. 11 is a side view, partly sectional, of a modification of the tongues of the fork of the trailer of my invention;

FIG. 12 is a view taken along lines 12—12 of FIG. 11; and

FIGS. 13 and 14 are top plan views of a clamping device shown in its open and closed positions, respectively, to be used on the trailer of my invention.

DESCRIPTION OF THE PREFERRED EMBODIMENT

Referring to FIG. 1 of the drawing, a tractor-trailer combination or system 10 is shown in accordance with the teachings of my invention. This system 10 includes a tractor 11 removably coupled to a trailer 12. The tractor 11 includes a main body portion 13 and a forward body portion 14. A single wheel 15 may be journaled in body portion 14 and operatively connected, through suitable coupling means, as is well known in the tractor art, to a steering device such as a steering wheel 16. Wheel 16 is connected to a shaft 17 extending into a suitable aperture in the top of main body portion 13 rearwardly of forward body portion 14. Shaft 17 is of course coupled to wheel 15, as discussed hereinabove. A pair of levers 18 and 19 (see also FIG. 2) are pivotally movable within slots 20 and 21, respectively, also formed in the top of main body portion 14 on both sides of steering wheel 16. Levers 18 and 19 are operatively connected to a suitable motor (not visible in FIG. 1) disposed internally of main body portion 15. A control panel or console 22 is disposed at the rear portion of main body portion 13 and includes suitable controls thereon operatively connected to the motive power for tractor 11.

The motor of tractor 11 may be activated by any suitable means, such as battery power. Thus, one or more suitable batteries (also not visible in FIG. 1) may be mounted in a battery housing 23 on tractor 11 above forward body portion 14. An electrical connection 24 extends from housing 23 (and is of course coupled to the battery or batteries therein) and has a plug 24a removably secured to an electrical outlet 25 at the forward front wall 26 of main body portion 13.

A pair of wheels 27, 28 (see also FIG. 2) are disposed at the bottom of main body portion 13 below control panel 22 and journaled for rotation within suitable wheel covers 29. A platform 31 extends from the bottom of main body portion 13 rearwardly thereof. As shown more clearly in FIG. 2, a support section 32 extends upwardly from the rear end of platform 31. A back rest 33 is fixedly mounted at the upper end of support section 32. Finally, an elongated tubular member 34 extends across the back of back rest 33 and, as seen in FIG. 2, includes push buttons 35 and 36 axially mounted therein. These push buttons 35 and 36 are clearly accessible from either side of tractor 11 (push button 36 not visible in FIGS. 1 and 2). Further, electrical connections (not shown) extend between each push button 35, 36 and the suitable motive means for tractor 11. These connections may extend internally within support section 22 and inside of platform 31 and body portion 13. The operation of push buttons 35 and 36 will be explained more fully hereinbelow.

The batteries may be removed from housing 23 for shipping purposes, if desired. Also, steering wheel 16 and wheels 15, 27 and 28 may be so removed, if desired. In any event, excepting for push buttons 35, 36 and their connection to the motor within tractor 11, the foregoing has described a conventional tractor 11 having a platform 31 upon which the operator stands and drives the tractor 11 via suitable controls on console or panel 22 and levers 18, 19 which operatively engage the motor thereof for selectively moving the tractor 11 in forward and backward directions.

As shown schematically in FIG. 3, a conventional timing device 37 is shown operatively connected to push buttons 35, 36 and motor 38. Device 37 and motor 38 are mounted internally of the main body portion 13 of tractor 11. Motor 38 may be controlled independently from manual control 39a (which of course may be mounted on the console or control panel 22). Levers 27, 28 (not shown in FIG. 3) are of course part of the manual control 39a. The batteries 23a within housing 23 are operatively connected to motor 38. As can be seen in FIG. 3, activation of either push button 35 or 36 activates the timing device 37 which in turn activates motor 38. Thus, by pushing either button 35 or 36, motor 38 is started and may be activated in only a single direction (i.e., to drive tractor 11 only in a forward direction). The timing device 37 may be preset to drive motor 38 (and thus tractor 11) for only a relatively short period of time and at a preselected revolution (e.g., 2 seconds at 1 mile per hour). Also, successive pressings of push buttons 35, 36 may be cumulative. That is, if buttons 35, 36 are activated more than once, timing device 37 may be set to cumulatively add such activations to thereby activate motor 38 a plurality of such preselected revolutions (for example, pressing either button 35, 36 six times activates motor 38 six successive times or, in the previous example given, for a total of 12 seconds at 1 mile per hour).

At the same time, controls on the tractor 11 may be used to override push buttons 35, 36 or run the tractor 11 at a faster rate of speed. Finally, similar push buttons, together with appropriate wiring means leading to motor 38, may be located at one or more points on trailer 12. Since such structure would be similar to push buttons 35, 36 and member 34 but merely located on trailer 12 with appropriate electrical connections therebetween, as will be described further hereinbelow, further illustration is deemed unnecessary.

The trailer 12 will now be described. As shown in FIGS. 1 and 3, the trailer 12 includes a generally U-shaped platform structure 39. A pair of wheel brackets 40 extend downwardly from each side of the bottom of the front of structure 39. Wheels 41 are journaled for rotation in each pair of brackets 40. The elongated sides 42 of structure 39 terminate in downwardly extending fender skirts 43. As shown in FIG. 1, a pair of rear wheels 44 are journaled in each skirt 43. These skirts 43 extend almost to the floor or ground 45 so that, should trailer 12 accidentally be driven out of control, the skirts 43 will prevent serious damage to the operator. Further, it has been found that locating wheels 44 in the fender skirts 43 as described hereinabove prevents excessive jackknifing of the trailer 12 with respect to the tractor 11 when the tractor 11 is driven in reverse. That is, fender skirts 43 and wheels 44 therein create sufficient drag to accomplish this since they combine to keep trailer 12 from moving into a jack-knifing position with any appreciable degree of speed.

The distance between the inner side flanges 46 of sides 42 of trailer 12 is generally related to the overall width of a conventional pallet (not shown) to be picked up by the fork 47 of trailer 12. Thus, flanges 46 assist in aligning pallets on trailer 12.

The means for coupling trailer 12 to tractor 11 will now be described. As can be seen in FIGS. 1 and 4, a hitch 48 having a pivotally mounted arcuate socket 49 is mounted on the rear of tractor 11. A cylindrical member 50 is fixedly secured in a vertical position within a pair of spaced, generally horizontal brackets 51 fixedly secured to the front of trailer 12. Member 50 is disposed at a suitable distance above ground so that it engages socket 49 of hitch 48 when the tractor 11 is moved into engagement with trailer 12 (the brackets 51 being above and below hitch 48 when in the locked position). Such movement into engagement with socket 49 pivots socket 49 to a closed position. A vertical pin 52, mounted on hitch 48, may be coupled, through suitable mechanism (not shown) to socket 49 to lock it in such position. A flag 53 is preferably fixed to the top of pin 52 extending generally normal thereto. Rotation of pin 52 serves to release the locking mechanism. Such mechanism is well known in the hitch art. However, flag 53 enables the operator to rotate pin 52 about its axis to unlock socket 49 without the necessity of grasping pin 52. That is, flag 53, as shown in FIGS. 1 and 4, is easily accessible to the foot of the operator, who need only to kick it into an unlocking position. Finally, electrical power to trailer 12 from tractor 11 may be provided by conduit 54 which extends from mechanism inside of trailer 12 (to be described hereinbelow) to a socket 55 on support section 32 which is in electrical contact with motor 38 through suitable conduits (not shown). This provides a quick disconnect means when it is desired to uncouple trailer 12 from tractor 11.

The operation of the fork-lift assembly of trailer 12 will now be described. Referring to FIG. 5, a portion of the housing 56 for the mechanism for lifting fork 47 has been omitted for convenience of illustration. Thus, a bracket 57 is fixedly secured to the upper surface of platform structure 39. The inner telescoping member 58 of a cylinder 59 is pivotally connected at point 60 to bracket 57. The outer member 61 of cylinder 59 is pivotally connected at point 62 to a bracket 63 on the housing 56. A hydraulic line 64 is in fluid communication at one end with the interior of cylinder 59 and at its upper end with a hydraulic pump 65. As shown schematically in FIG. 6, a suitable motor 66 and source of fluid supply 67 is in operative engagement with pump 65. A lever 68 extends through a slot 69 in housing 56 and is operatively connected to pump 65 for selectively admitting fluid to and releasing fluid from cylinder 59 to thereby extend and retract members 58, 61 as is well known in the art. Electrical power for motor 66 is provided via conduit 54 which, as has been explained, may be operatively connected to the batteries 23a in housing 23 on tractor 11.

The brackets 63 and 57 (FIG. 5) may be braced by means of upper and lower bracing members 69, 70, respectively, which are connected at one end to points 62, 60, respectively, and at their outer ends to points 71, 72 (which may be small sections of pipe or the like welded in place) at spaced locations on the upper vertical portion 73 of fork 47. A lock screw 74 may be threaded in a suitable aperture in the lower member 70. The head 75 of screw 74 extends downwardly and abuts against the upper surface of platform structure 39. In this manner, the height of fork 47 may be adjusted with respect to the ground or floor 45. A slot 76 may be provided in the outer end of screw 74 for easy adjustment thereof. A similar arrangement may be provided on the side of trailer 17 not visible in FIG. 5.

Screws 74 also compensate for any uneven welding of the components making up fork 47. In addition, they are easily accessible from the outside of trailer 12.

As can be seen in FIG. 5, the distance between points 62 and 72 is a generally vertical line. The distance between points 62 and 60 is such that an angle $\gamma$ is formed between these lines of about 22.75°. Thus, a slight tilting is imparted to the fork 47 when pump 65 is activated via lever 68, motor 66 and fluid supply 67 to extend cylinder 59. That is, the lower portion or tongues 77, shown in FIG. 5 as generally hoizontal to surface 45, make an angle of about 4° with respect to the horizontal (indicated in dotted lines) as shown schematically in FIG. 7 when it is raised. Thus, any load carried on fork 47 would rest back on and abut against the upright vertical portion 73.

It may be desirable to relieve some of the stresses in fork 47. Thus, as shown in FIG. 8, the fork 47 is generally comprised of a pair of hollow tongues 77 welded at 78 to an upright hollow vertical portion 73. Outside bracing plates 78a may be also welded between members 73, 77 as shown. A tension member 79, in the form of a generally rectangular plate (FIG. 9) may be welded in position within each tongue 77. The corners 80 thereof may be curved or trimmed as shown. This plate 79 is slightly bent, as at bend 81, so as to engage the inner upper surface 82 of tongue 77 and the corner of the inner lower surface 83. These points of junction may be welded as shown as at welds 84 and 85, respectively. Finally, a generally torsionally rigid tubular cross-member 86 extends between and is secured to each tongue 77 forming fork 47.

Various modifications of trailer 12 may be made. For example, as shown in FIG. 10, trailer 87 is identical to trailer 12 excepting that front wheels 41 and brackets 40 therefor have been omitted. Thus, instead of the hitch of trailer 12 shown and described hereinabove, a single rigid elongated tongue member 88 may be fixedly secured to the front of trailer 87 and pivotally connected to hitch 48 of tractor 11 as described hereinabove.

Although fork 47 of trailer 12 has been shown and described as having a pair of elongated rigid tongue 77, these tongues may be modified as shown in FIG. 11 to accommodate both carts and pallets, specifically carts of different wheel base lengths. That is, each fork tongue 89 may be comprised of an outer hollow member 90 having stops 91 thereon and an inner telescoping member 92 having stops 93 thereon. The length of member 92 is generally related to the length of member 90 so that it can be completely telescoped therein. Stops 93 engage stops 91 to prevent accidental disengagement thereof. Of course, if desired, these stops could be omitted. Also, any suitable means may be provided for telescoping member 92; in fact, it can be done manually, if desired. Further, instead of telescoping members 90, 92, fork 89 may be comprised of a pair of folding members (not shown), if desired.

Finally, as shown in FIG. 12, each member 90 and 92 of tongue 89 may include a channel 94 extending therealong for receiving the wheels 95 of a conventional wheeled folding loading cart 96 (FIG. 2) for aligning the cart 96 on the trailer 12. That is, the fork 47 of the trailer 12 in FIG. 2 may be similar to the fork of FIGS. 11 and 12.

As can also be seen in FIG. 2, the cart 96 is comprised of a plurality of generally vertical or upright spaced posts 97. The forward posts 97 abut against the rear of each of the upright vertical portions 73 of the fork 47 (or the fork of FIG. 11). If desired, as shown in FIG. 13, a pair of clamping devices 98 may be provided on the rear of each portion 73. These devices 98 are comprised of a pair of pivotally connected — at point 99 — C-clamps 100 which are adapted to close when posts 97 engage the inner portion of one of the C-clamps 100 to thus move these claims 100 into locking engagement (FIG. 14). Electrical contacts 101 are carried by the free ends (FIG. 13) of each device 98 and move into contact when clamps 100 close (FIG. 14). Suitable electrical connections — not shown — may be provided between contacts 101 and the pump 65 on trailer 12. It is to be understood that devices 98 are located on portions 73 so that the clamps 100 may pass around posts 97 without interference from the horizontal members 102 making up cart 96. The electrical connections to pump 65 may be such that the pump 65 is in a locked (or non-pumping) position until contacts 101 close to thereby unlock the pump mechanism. Thus, raising of the fork may be prevented until cart 96 is in its proper position on the fork.

It can be seen from the foregoing that I have disclosed a unique and novel system for towing and operating a fork-lift trailer with various modifications for quickly and efficiently carrying out the type of operations used in material-handling with such towing packages.

I claim as my invention:

1. A system for towing and operating a fork-lift trailer comprising:

a wheeled motor-driven tractor;

a wheeled trailer pivotally and removably connected to said tractor;

first motor activating means disposed on said tractor and operatively connected to said motor for actuating said motor to drive said tractor both forwards and backwards;

second motor activating means associated with said system remote from said first motor activating means and operatively connected to said motor for both starting said motor and activating said motor in only its forward direction for a preselected length of time;

means disposed on said trailer operatively engaging the fork-lift thereof for automatically raising the fork-lift thereof in generally a vertical direction;

said fork-lift including a pair of spaced, generally horizontal tongues fixedly connected to a pair of interconnected generally upright members;

said upright members of said forks being connected to the trailer frame by means of two links, one end of each of said links being connected to said upright members, and the other end of said link being connected to said trailer frame such that an acute angle is formed between said links when the fork is in its lowermost position and parallel to the supporting surface; and said means for raising said fork-lift including means thereon for moving said fork-lift from a first position whereby said tongues are generally parallel to a supporting surface to a second position whereby said tongues are at an angle with respect to the horizontal.

2. The system of claim 1 wherein said angle is about 4° with respect to the horizontal.

3. The system of claim 1 wherein said trailer includes means thereon operatively engaging the fork of said fork-lift for adjusting the height and angle of said fork with respect to the horizontal.

4. The system of claim 1 wherein the fork of said fork-lift includes a pair of spaced generally horizontally extending tongues, each of said tongues including an outer member generally related to the overall length of said trailer and an inner member telescoping into said outer member and generally the same length thereof.

5. The system of claim 4 wherein a channel extends generally downwardly along the upper surfaces of each of said inner and outer members.

6. The system of claim 1 wherein said trailer includes fork-lift means thereon for automatically and selectively raising and lowering the fork-lift thereof, said fork-lift including a goods-bearing generally horizontally extending fork and a generally upright member fixedly secured to said fork, and means associated with said trailer for maintaining said fork lift means in an inoperative position until goods or the like carried by said fork abut against the upright member of said fork-lift.

* * * * *